United States Patent

Czulak

[11] Patent Number: 4,518,616
[45] Date of Patent: May 21, 1985

[54] PROCESS FOR RECOVERING THE WHEY PROTEINS, THE APPLICATION THEREOF TO CHEESE-MAKING AND THE RESULTING CHEESES

[75] Inventor: Joseph Czulak, South Yarra, Australia

[73] Assignee: Institut National de la Recherche Agronomique, Paris, France

[21] Appl. No.: 444,066

[22] Filed: Nov. 24, 1982

[30] Foreign Application Priority Data

Nov. 24, 1981 [AU] Australia .............................. 1682/81

[51] Int. Cl.³ ...................... A23C 19/05; A23C 21/06; A23C 9/142
[52] U.S. Cl. ...................................... 426/40; 426/41; 426/42; 426/491; 426/582; 426/583
[58] Field of Search ........................ 426/34, 36, 38, 40, 426/41, 42, 491, 582, 583; 435/311

[56] References Cited

U.S. PATENT DOCUMENTS 3,930,039 12/1975 Kuipers .................................. 426/41
4,188,411 2/1980 Kuipers et al. ....................... 426/583
4,194,011 3/1980 Invernizzi et al. .................... 426/38
4,205,090 5/1980 Maubois et al. ..................... 426/491
4,341,801 7/1982 Weissman .......................... 426/491

OTHER PUBLICATIONS

Collier's Encyclopedia, vol. 5, (1984), p. 575.

Primary Examiner—Raymond Jones
Assistant Examiner—Marianne S. Minnick
Attorney, Agent, or Firm—Oblon, Fisher, Spivak, McClelland & Maier

[57] ABSTRACT

The invention relates to a process for the recovery of whey proteins and their utilization in cheese making. Whey separated from cheese curd during normal processing is first pasteurized and then subjected to ultrafiltration to provide a whey protein concentrate, the concentrate is mixed with milk and the thus enriched milk is subjected to further ultrafiltration after which it is treated in the usual manner to form a curd.

Cheese-making includes fermentation of the enriched curd product of the above process. According an alternate embodiment, the cheese-making comprises the steps of (a) curdling of the mixture of milk and whey protein concentrate and (b) ultrafiltration of the coagulum, in which case the desired cheese is directly obtained after said ultrafiltration.

5 Claims, 1 Drawing Figure

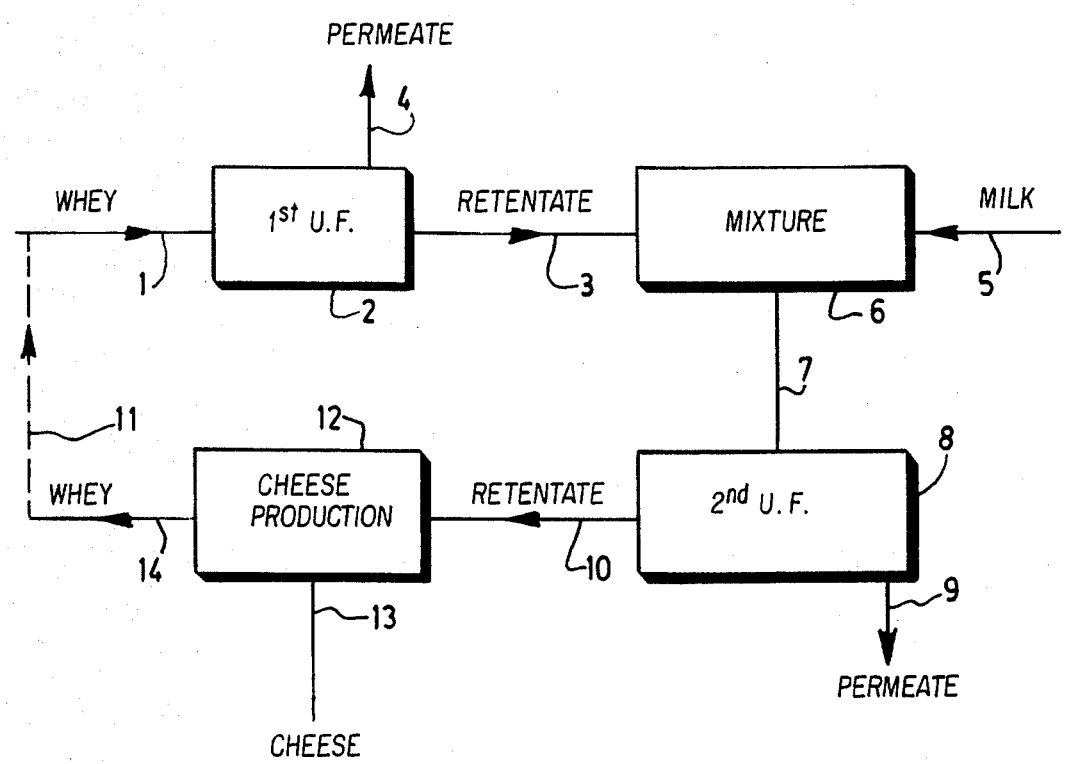

PROCESS FOR RECOVERING THE WHEY PROTEINS, THE APPLICATION THEREOF TO CHEESE-MAKING AND THE RESULTING CHEESES

This invention relates to a cheesemaking process and is particularly concerned with a process for the recovery of whey proteins and their utilization in cheese manufacture.

Natural cheese products, for example, Cheddar, stirred curd, Colby, Gouda, or Swiss, are made by coagulating milk, ripened with suitable lactic acid producing bacteria to a suitable acidity, with appropriate milk clotting enzymes, cutting the coagulum and cooking the resulting curd in its whey. The whey is drained from the curd, whereupon the curd may be cheddared or stirred while additional acid is produced by fermentation of lactose to lactic acid in the curd. The curd may or may not be washed with water. If cheddared, the curd is milled, salted and pressed into rounds, blocks or the like for maturing. The addition of lactic acid-producing bacteria, ripening of the milk, cutting the curd, cooking the curd, stirring the curd, cheddaring the curd and salting the curd are all controlled to yield a product in which the residual lactose and the unused buffer capacity of the curd are balanced so that complete fermentation of the residual lactose in the curd to lactic acid will result in a cheese with the proper minimum pH for the particular market requirements, usually between 4.9 and 5.5.

The conventional processes for making natural and processed cheese essentially utilize only casein. Only a few percent of most of the whey proteins are incorporated into the cheese, the balance remain dissolved in the whey and are discharged as a by-product of the process. The whey proteins comprise about 14 to 24 weight percent of whole or skim milk's proteins and the nutritional value of the whey proteins is at least comparable to the nutritional value of casein. Accordingly, the loss of the whey proteins in the conventional cheese making processes limits the potential yields of such processes. The utilization of even a portion of the whey proteins in the manufacture of natural and processed cheeses is of great commercial importance.

In the past therefore, efforts have been made to design a process that would allow full utilization of the whey proteins in cheese making.

One approach is to recover whey proteins from the whey by drying, condensing, ultrafiltration, or reverse osmosis of the whey. The recovered whey proteins are then recombined with the cheese. Such processes are described for example in F. V. Kosikowski, Cheese and Fermented Foods, Edwards Brothers, Inc., Ann Arbor, Mich., 2 ed. 1977, pp. 451–458.

One problem associated with this approach is that the recovered whey constituents lack the physical and chemical characteristics required for the making of natural cheese. For example, the dried whey proteins can be sprinkled into the cheese curd but only a limited amount of whey proteins can be added to cheese curd in this matter without changing its desired properties. In general, addition of whey proteins to cheese curd may lead to a grittiness and a bitter taste in the final product and accordingly, the whey proteins recovered from whey are not used to any significant extent in commercial processes for making natural cheese.

For these same reasons whey proteins recovered in this manner are not used to any significant extent in the commercial manufacture of process cheeses. Moreover, it is commercially feasible to add only limited amounts of such recovered whey proteins to process cheese spreads, process cheese foods, process cheese products, or imitation cheeses.

Anyway, in all these known processes, the maximum amount of whey proteins which can possibly be introduced in the cheese cannot exceed the amount of whey proteins contained in the milk wherefrom the starting whey was derived. It is known that the proportion of so-called soluble proteins (or whey proteins) in cow-milk is about 20% by weight as related to the total proteins in the milk. This value may vary somewhat according to the milch female, the season, the feeding of the milcher and other parameters well known in the art. Thus, it is not possible to introduce in the final cheese more than about 20% by weight of whey proteins and, as set forth above, such amount cannot even be reached in practice when the whey proteins have undergone denaturation while being separated, especially as a result of the pH changes or the temperature rise.

As a matter of fact, to retain acceptable organoleptic properties in the final cheese, it is compulsory to limit the amount of whey proteins incorporated in the milk (or curd) intended for cheese-making.

Another approach for utilization of whey proteins in cheese making is to co-precipitate them with the casein. One such process for obtaining co-precipitates of casein and whey proteins from milk is disclosed in U.S. Pat. No. 3,535,304. The products of this process, however, do not have the characteristics that are required for making cheese.

Other known processes for the production of co-precipitates of casein and whey proteins also result in products that, although useful for some applications, cannot be used as starting materials for making cheese.

It has also been proposed to produce products suitable for conversion into cheese by altering the composition of whole or skim milk utilizing ultrafiltration or reverse osmosis. Australian Patent specification No. 477,339 describes a process wherein whole or skim milk is treated by ultrafiltration to about one fifth of its volume to give a product, sometimes called a "liquid pre-cheese", which is then fermented by conventional means to give cheese. Such a product, however, is suitable for making fresh soft cheeses of the Camembert or Reblochon type and semi-hard cheeses. It cannot be yet used to produce harder cheese of the Cheddar, or Colby or stirred-curd type, because its water content is too high and because the high viscosity of the liquid pre-cheese.

More recently, there has been described a process in which the moisture content and pH of the final product can be controlled to any desired level, thereby to provide a product which has a moisture content and pH appropriate for use as a substitute for natural cheeses in the production of process cheeses. In this process (see "Cheese Base for Processing: A High Yield Product from Whole Milk by Ultra-filtration", C. A. Ernstrom, B. J. Sutherland and G. W. Jameson, *Journal of Dairy Science*, 63, 228, (1980), whole milk of normal pH or acidified to pH 5.7 is concentrated by ultrafiltration to 40% original milk weight, diafiltered at constant volume until a desired ratio of lactose to buffer capacity is established, and concentrated by ultrafiltration to 20% milk weight. The retentates are then inoculated with cheese starter and incubated to ferment completely the residual lactose.

The last-mentioned processes, however, depart radically from conventional cheese making procedures.

The present invention seeks to provide a process by which whey proteins can be recovered and incorporated into a conventional cheese product, without the disadvantages previously noted and which can be associated with and utilize conventional cheese-making plants and processes.

The present invention also has for its object a process of cheese-making which incorporates said process for recovering the whey proteins and provides a yield highly increased as compared to the known processes.

The invention has for a further object new products consisting of cheeses which contain whey proteins in proportions never reached heretofore while having good organoleptic properties.

According to the present invention there is provided a whey protein recovery process in which whey separated from cheese curd during normal processing is first pasteurised and then subjected to ultrafiltration to provide a whey protein concentrate, the concentrate is mixed with milk and the thus enriched milk is subjected to further ultra-filtration after which it is treated in the usual manner to form a curd.

The milk added to the whey protein concentrate may be full-cream or skim milk or a mixture of the two.

The purpose of mixing the milk with the whey protein concentrate is to thereby provide sufficient casein so that, on coagulation with rennet or any other coagulating enzyme, a network of fibres will be formed which will trap or enmesh the concentrated whey protein.

The resulting curd may then be mixed with ordinary cheese curd, e.g., from any conventional process, and fermented, or it may be fermented separately to produce a novel cheese product. In either case a product is obtained which contains increased amounts of whey protein. The overall yield of the process is at least about 8% but may be up to 40% higher than a conventional cheese-making process, depending on the proportions of the whey concentrate and milk used.

Pasteurization before the first ultrafiltration stage is necessary to inhibit acid development in the whey. Preferably pasteurization is carried out at a temperature of at least 165° F. for 15 seconds.

Preferably the ultrafiltration steps should each be carried out so as to provide a 5 to 6-fold concentration. It is possible, however, to operate the process of the invention with concentration ratios as low as 3.5.

The amount of added milk governs the firmness of the curd from the enriched product and hence the degree of recovery of the whey protein in the final product. By selection of the milk/whey protein concentrate ratio, it is thus possible to adjust the proportions of casein and whey proteins and hence the nature of the final cheese product obtained. This permits the use of the process in the production of a wide variety of cheese products ranging, for example, from hard cheeses suitable for processing to soft cheeses which are marketable as such. The addition of ordinary curd to the enriched curd adds further to the variety of cheese products which may be obtained.

Typically the volume of milk which is mixed with the whey concentrate after the first ultrafiltration should be at least twice and preferably from 2 to 5 times, the volume of the whey concentrate.

After the second ultrafiltration step the usual procedure is to add rennet and starter to the enriched mixture at a temperature of 86°–88° F. to bring about coagulation of the casein and provide suitable conditions for further fermentation.

The coagulated curd may then be cut into particles of appropriate size to allow it to drain, if necessary.

If the enriched curd is mixed with ordinary curd before fermentation, the ratio of enriched to ordinary is preferably about 1:4. The curd product is very tough, so much so that special cutting procedures may be required.

Cheese produced by the process is essentially natural in character and does not possess the grittiness or bitterness which normally results from addition of precipitated whey proteins.

The major feature of the new cheeses is that the whey proteins are present therein in solution in the aqueous phase, only the casein being curdled, and that the proportion of said proteins in the aqueous phase is higher than that in the starting milk.

If, as preferred, the cheese is made from cow-milk, then its whey protein content is higher than about 20% by weight as related to the total cheese proteins.

Still preferably, the whey protein content of the cheese will range from about 20% to 45% by weight as related to the total proteins. In fact, it was found that above 45%, the amount of whey proteins becomes to high and does not allow obtention of cheeses having the desired consistency and organoleptic properties.

In the present invention, the whey proteins are not altered. Indeed, when mixing the milk and the retentate from the first ultrafiltration stage, there is obtained a dairy product wherein the proteins are not curdled and wherein the whey proteins are enmeshed in their natural state into the molecule lattice of the casein. This sort of mechanical trapping is assisted by the fact that the *casein micellae* have a porous structure apt to collect the whey proteins.

In the final cheese according to the invention, the casein is curdled, but the whey proteins are still present in the undenatured state in solution in the aqueous phase.

This new property may be evidenced if the cheese is subjected to intensive ultracentrifuging, this allowing separation, on the one hand, of the curdled casein and, on the other hand, of an aqueous phase containing the whey proteins.

The invention permits production of cheeses which have good organoleptic properties and contain whey proteins in proportions never reached heretofore, to the best of the Applicant's knowledge.

The ultrafiltration equipments used in the present invention are of the type known in the art and require no further description. If so required, reference may be had to the prior art recited at the beginning of the present specification and relating to ultrafiltration of whey, of milk and other dairy products. The membranes in the ultrafiltration modules should be able to retain the whey proteins. There may be used, for the first stage of whey ultrafiltration, an equipment different from that used in the second stage for ultrafiltrating the mixture of milk and whey protein concentrate derived from the first ultrafiltration stage. It is also possible to use the same equipment for successively effecting the two ultrafiltration stages.

According to an advantageous feature of the invention, it is possible, by varying the proportion of whey proteins mixed with the milk before the second ultrafiltration step, to finally obtain cheeses which meet precise nutritional requirements and have variable whey proteins contents as related to the total proteins. It should be noted that cheese-making effected according to the known technique by directly ultrafiltrating the milk and converting the retentate into cheese leads to a product wherein the proportion of whey proteins as related to the total proteins is fixed and corresponds to that in the starting milk.

There may be produced cheeses of any known type, and using a plant which is conventional in cheese-making. The production of cheeses is attended by a syneresis.

With a view to curdle the retentate derived from the second ultrafiltration stage, use may be made of any of the curdling means known in the cheese industry, such as enzymes, whereof that of most frequent use is rennet, alimentary acids such as hydrochloric acid, lactic starters or combinations of such means, e.g. an acid-rennet combination.

According to an alternate embodiment, which may be advantageous for the production of some types of cheeses, such as fresh cheeses, the process of the invention involves curdling of the mixture of milk and whey retentate before ultrafiltration thereof, the latter being then effected on the coagulum. This results in the direct obtention of the cheeses, mostly fresh cheeses, possessing excellent organoleptic properties and a light texture, wherein casein is largely replaced by the whey proteins.

According to an advantageous alternate embodiment of the invention, advantage may be taken of the lactic acidity present in the whey subjected to the first ultrafiltration, and which will be partly present in the whey protein retentate mixed with the milk, for both adjusting the mixture pH to a desired value and thus effect concomitantly partial solubilization of the phosphocalcic salts in said mixture, which salts will then be removed in the permeate obtained upon the second ultrafiltration, this leading then to a desired partial demineralization of the retentate obtained upon said second ultrafiltration.

The invention is further illustrated by the following description, made with reference to the appended drawing which is a flowsheet of the process.

The pasteurized whey 1 is subjected to a first ultrafiltration stage (numeral 2). There is thus obtained a retentate 3 containing an increased proportion of whey proteins and a permeate 4, which is rejected or treated later on for further recovery of the products contained therein, such as lactose. The retentate or concentrate (3) of whey proteins is mixed at a mixing stage 6 with milk 5. The mixing is effected in variable proportions, for example of 2 to 5 volumes of milk for 1 volume of concentrate. The resulting mixture 7 is subjected to an ultrafiltration stage 8 affording separation of a permeate 9 and a retentate 10 wherein the total protein content is higher than that of mixture 7. The retentate 10 serves as a raw material for the cheese-production 12, which is effected in a conventional manner. According as the starting milk 5 is whole or skim milk, the fat content should be adjusted at 12. Also at this stage 12 are effected the usual additions and steps depending on the particular type of cheese to be produced. After syneresis, the cheese as a final product is obtained at 13. The whey collected at 14 may be recycled through line 11 for joining, after being pasteurized, the whey 1 to be processed.

It will be understood that the appended diagram is simplified to permit good understanding of the process of the invention. In practice, ultrafiltrations involve recycling steps to ensure repeated passages of the product through the ultrafiltration membrane and thus obtention of the desired protein concentration in the retentate.

The invention is illustrated by the following Examples.

EXAMPLE 1

Skim milk (400 gallons; 1816 l) was mixed with 908 l of whey which had been concentrated 5-fold by ultrafiltration. (The whey was obtained from the previous day's production of conventional cheddar cheese). The mixture was then concentrated about 3.7 times by ultrafiltration. Using the conventional procedures for stirred-curd cheese-making, the mixture was then curdled and the curd cut, drained, salted and hooped to form a skim milk cheese which was suitable for processing.

The compositions of the materials at various stages of the process were as follows (figures are percentages).

|  | FAT | T.S.* | PROTEIN |
| --- | --- | --- | --- |
| Skim milk | 0,194 | 10,30 | 3,9 |
| Whey retentate | 0,340 | 13,1 | 4,9 |
| Mix before U.F. | 0,195 | 10,9 | 4,23 |
| Mix after U.F. | 0,740 | 23,5 | 15,6 |
| Whey after cutting | — | — | 9,8 |
| Whey expressed | — | — | 9,3 |

*Total solids

The cheese product obtained from 180 liters of the concentrated milk/whey mixture weighed 4.84 kg and had the following composition.

| Moisture | 50.5% |
| --- | --- |
| Fat | 2.1% |
| Protein | 38.3% |
| Salt | 2.9% |
| pH | 5.25 |

The following calculations show the advantages to be gained by the practice of the invention.

Before ultrafiltration:

Total volume of skim milk + whey retentate
= 2724 liters
Protein content = 4.23%

After ultrafiltration (3.7×concentration)

$$\text{Volume of Retentate} = \frac{2724}{3.7} = 763 \text{ liters}$$

Protein content = 15.64%

180 liters of retentate thus contained approximately 28.15 kg of protein. Out of this was lost 180 liters whey less 48.4 kg cheese, i.e. 131.6 liters containing 9.8% protein, i.e., 12.90 kg of protein. Therefore there remained in cheese 15.25 kg of protein, which together with the moisture, salt, ash and fat gave 48.4 kg of cheese.

For the full amount of skim milk (1816 l) and whey retentate (908 l) used, the calculated yield of cheese would be 199.5 kg according to the above data. By comparison using 1816 l of the skim milk alone the yield of cheese which could be obtained is estimated at 156.2 kg (assuming an 8.6% yield of cheese with a 50% moisture content).

Thus the process of the invention provides a nett gain of approximately 28.15 kg (199.5–156.2) of cheese over the conventional process.

It is further noted that the whey which was separated from the cheese produced using the method of the invention can be recycled for admixture with a further batch of skim milk. Thus the 12.9 kg of protein not retained in the cheese product can be at least partially harvested.

Furthermore, if the concentration of mixture by ultrafiltration is increased to 4.5 instead of 3.7, a yield increase of 33% could be obtained.

EXAMPLE 2

Production of fresh cheeses

In Example 2, use was made of an alternate embodiment of the method of the invention, which is suitable for the production of fresh cheeses. According to this embodiment, the milk and whey concentrate mixture is curdled previous to the second ultrafiltration (numeral 8 in the FIGURE). The latter was thus effected on the coagulum and allowed direct obtention of a retentate constituting the desired final cheese. In the following experiments the whey was ultrafiltrated (numeral 2 in the FIGURE) up to a factor of 5. The resulting retentate, which is concentrated in whey proteins, is designated hereinafter by the contraction "whey retentate×5".

Two experiments for fresh cheese production were effected by ultrafiltration of a curdled mixture (skim milk and whey retentate×5).

Experiment No. 1: 70 liters of whey retentate×5, mixed with 140 liters of skim milk: i.e. a ratio of non caseic nitrogen to total nitrogenous matter of 43.4%.

Experiment No. 2: 40 liters of whey retentate×5, mixed with 180 liters of skim milk: i.e. a ratio of non caseic nitrogen to total nitrogenous matter of 31.6%.

The milk used was skim milk previously subjected to a HTST pasteurization step (72° C., 15 sec) at the factory. The whey was derived from the production of Emmenthal and was similarly subjected to a HTST pasteurization step at the factory.

The whey ultrafiltration was effected batchwise at 50° C. on a ROMICON module equipped with PM50 membranes affording a surface-area of 4.90 m2. The 5-fold concentrated retentate was mixed with the skim milk and subjected to a second heat treatment (92° C.—15 sec).

To the mixture cooled to 28° C., there was added 1% of mesophile lactic starters. When the pH reached a value of 6.30, there was added 20 g of CaCl$_2$ and 1.5 ml of rennet (strength 1/10,000) per 100 liters of mixture. The temperature reached 20° C. within 18 hours and the coagulum formed had a pH of 4.50.

After manual decurdling, the coagulum was ultrafiltrated on a module equipped with inorganic membranes affording together a surface-area of 1.6 m². The module consisted of two 0.8 m² cartridges, the first with 081 bis type membranes and the second with 405 type membranes. The ultrafiltration was effected batch-wise and continued up to the maximum pressure loss (8 kg/cm²) which the equipment pumps could sustain. The recycling rate was of 4 m³/hour, i.e. the product was circulated on the membrane at a rate of 1 m/sec. The ultrafiltration temperature was gradually increased from 20° C. to 40° C. Retentate samples were taken during the ultrafiltration step when the concentration factor was close to ×2.4–3 and at the final concentration, then they were directly packed in jars and stored at 2° C.

Table I hereunder shows the chemical composition of the products used: the skim milk-and-whey retentate mixture has a dry matter content and nitrogenous matter content close to that of a skim milk, but with a NCN/TNM ratio higher than that of milk. Such ratio decreases when the mixture is heated to 92° C., 15 sec., being reduced from 43.4% to 30.4% for trial No. 1 and from 31.6% to 20.6% for trial No. 2. The calcium content, close to 1 g/kg, is lower than that of a milk.

The lactose content after acidification of the mixture is by 20% higher than that of the curd derived from skim milk along after direct ultrafiltration of the milk or a milk coagulum.

Table II sets forth information as to the chemical composition of the products obtained. The maximum concentration factor reaches the value×4 in trial No. 1, viz, a product with a dry matter content of 20.2% and a nitrogenous matter content of 13.7%. This concentration factor×4 could be reached by off-circuiting the exchanger, this permitting to reduce the pressure loss in the ultrafiltration system.

The chemical composition of the permeates is shown in Table III.

The study of the viscosity changes of the products obtained as a function of the velocity gradient at a temperature of 40° C. shows that the products have a pseudoplastic, non-newtonian behaviour since the viscosity decreases as the velocity gradient increases. These soluble protein-enriched products have a viscosity markedly lower than that of products derived from milk alone. As a matter of fact, a total nitrogenous matter contact of 11.5% with NCN/TNM=0.43 (case of Trial No. 1) should be reached for the obtention of an approaching viscosity in retentates of skim milk (alone) having a TNM content of 8.6% with $$\frac{NCN}{TNM} = 0.23$$

This phenomenon seems to be less marked when the NCN/TNM ratio is of 31.6% (case of Trial No. 2):in fact, the product having a TNM content of 11.3% has a viscosity only by 20% lower than that of a product derived from a coagulum of skim milk with a TNM content of 11.5%.

The cheeses obtained were highly appreciated by a group of tasters, who concluded in favour of their very good organoleptic properties. They differ from the conventional fresh cheeses by their light texture.

This Example shows that the process of the invention allows obtention of fresh cheeses having good organoleptic properties while replacing the casein by the whey proteins (or soluble proteins), which until now have found no, or poor, valorization.

TABLE I

Chemical composition of the products used
(Results expressed in g/kg)

| | Experiment No. | (1) TDE | (2) TNM | (3) NCN | $\frac{NCN}{TNM}$ | (4) NPN | Ash | Ca Total | Lactose | pH |
|---|---|---|---|---|---|---|---|---|---|---|
| Skim milk | 1 | 88.75 | 35.53 | 7.69 | 0.23 | 1.46 | 7.5 | 1.25 | 47.5 | 6.59 |
| | 2 | 87.9 | 31.20 | 7.43 | 0.24 | 1.46 | 7.43 | 1.21 | 43.8 | 6.66 |
| Whey | 1 | 57.4 | 8.55 | 7.70 | 0.90 | 1.75 | 4.77 | 0.35 | 44.1 | 6.63 |
| | 2 | 57.3 | 8.42 | 7.74 | 0.92 | 1.89 | 4.75 | 0.33 | 55.0 | 6.45 |
| Whey retenta- | 1 | 84.87 | 37.55 | 28.03 | 0.75 | | 5.71 | 0.59 | 41.7 | 6.90 |
| te x 5 | 2 | 88.3 | 35.06 | 28.55 | 0.81 | | 5.58 | 0.48 | | 6.96 |
| Mixture | 1 | 85.0 | 32.5 | 14.10 | 0.434 | | 6.73 | 1.01 | | 6.70 |
| | 2 | 87.8 | 33.2 | 10.52 | 0.316 | | 7.09 | 1.07 | | 6.71 |
| Mixture | 1 | | 31.34 | 9.54 | 0.304 | 2.13 | | | 46.9 | 6.63 |
| 92° C. 15 sec. | 2 | | 34.53 | 7.12 | 0.206 | 1.76 | | | 43.8 | 6.60 |
| Curd | 1 | | | | | | | | 41.0 | 4.38 |
| Curd | 2 | | | | | | | | 37.3 | 4.34 |
| (5) (reference) | | 89.6 | 34.4 | 4.83 | 0.140 | | | | | |

(1) TDE = total dry extract
(2) TNM = total nitrogenous matter
(3) NCN = non-casein nitrogenous matter
(4) NPN = non-proteic nitrogenous matter
(5) The reference curd was obtained upon direct ultrafiltration of the milk and conversion of the retentate into fresh cheese according to known technique.

TABLE II

Chemical composition of the products obtained
(Results expressed in g/kg)

| | Experiment No. | TDE | TNM | Ash | Ca | Lactose | pH |
|---|---|---|---|---|---|---|---|
| Retentate × 2,4 | 1 | 155.5 | 84.34 | 6.60 | 1.15 | 36.6 | 4.46 |
| | 2 | 134.3 | 80.96 | 7.20 | 0.95 | 35.9 | 4.38 |
| Retentate × 3 | 1 | 168.7 | 114.7 | 6.72 | 1.14 | 37.5 | 4.51 |
| Final ret | 1 | 202.0 | 136.6 | 6.94 | 1.08 | 39.2 | 4.53 |
| retentate | 2 | 168.9 | 113.36 | 7.30 | 0.75 | 36.7 | 4.41 |

TABLE III

Chemical composition of the permeates
(Results expressed in g/kg)

| | Experiment No. | TDE | TNM | NPN | α-Lactalbumin | β-lactoglobulin |
|---|---|---|---|---|---|---|
| Average permeate Whey | 1 | 49.4 | 3.14 | 2.51 | 0.380 | 0.250 |
| | 2 | 50.5 | 2.26 | 1.46 | | |
| Average permeate 081 bis | 1 | 45.7 | 2.58 | 2.16 | 0.080 | 0.140 |
| | 2 | 52.5 | 3.78 | 2.48 | | |
| Average permeate 405 | 1 | 50.75 | 3.24 | 2.54 | 0.170 | 0.245 |
| | 2 | 56 | 5.26 | 2.92 | | |

EXAMPLE 3

Production of semi-hard cheese (1) Ultrafiltration equipment

The ultrafiltration of whey and milk was successively effected on the same module (SFEC apparatus) comprising two stages:
a first stage consisting of two cartridges of inorganic membranes: S150 (total surface-area 7 m²)
a second stage consisting of two cartridges of inorganic membranes: S37 (total surface-area (1.8 m²)
The ultrafiltration was effected batch-wise with recycling of the retentates until the sought concentration was obtained.

(2) Preparation of the whey retentate

There was used a whey of Emmenthal cheese heated to 80° C. during 15 seconds, after having been stored overnight at 2° C. The volume used was of 1,050 liters.
Ultrafiltration:
Filling of the vat (400 liters)—Reheating to 50° C.
Starting of the ultrafiltration in the following hydrodynamic conditions:
1st stage: ΔP=4.8–2.9 bars
2nd stage: ΔP=4.0–2.7 bars
The remaining whey was added by small portions in the vat of the ultrafiltration apparatus to compensate for the withdrawn volume of permeate.
The temperature of the whey undergoing ultrafiltration varied between 55° C. and 46° C.
Performances: 846 liters of permeate (permeate (1) were withdrawn within 1 h 05 minutes.
pH of the whey retentate: 5.50.

(3) Preparation of the pre-cheese (mixture of milk and whey retentate)

The milk used was a milk for Emmenthal cheesemaking heated to 80° C. for 15 seconds, fat-enriched through addition of pasteurized cream. Its volume was of 435 liters.
The milk was added to the whey retentate in the vat of the ultrafiltration apparatus: the ultrafiltration was continued during the milk addition. The milk addition was effected as follows: about 200 liters as soon as the desired concentration of the whey was obtained, then the remainder by small portions as a compensation for the withdrawn volume of permeate.

Progress of the ultrafiltration (including that of the whey)

$t_o$: starting of the whey ultrafiltration
$t_o$+1 h 05: end of the whey ultrafiltration
addition of the milk
$t_o$+1 h 37: end of the milk addition
$t_o$+1 h 47: addition of 2 liters of thermophilic starters
pH of the retentate before addition: 6.55
pH of the retentate after addition: 6.48
$t_o$+2 h 01: volume of permeate (permeate 2) recovered between $t_o$+1 h 05 and $t_o$+2 h 01: 450 liters addition of 205 liters of water at 55° C.
$t_o$+2 h 42: taking of retentate: 6 liters $t_o+3$ h 08: cutting off the recycling pump—Retentate pH=6.47 withdrawn permeate: 310 l (permeate 3)

The retentate is kept circulating by means of the feed pump.

$t_o+3$ h 10: addition of:
1 liter thermophilic leavens
0.9 l mesophile leavens
100 ml suspension propionic bacteria
90 ml of a solution of proteolytic enzyme (0.9 g of powder)

$t_o+3$ h 20: stoppage

Results

The results of the analyses are set forth in Table IV hereunder.

TABLE IV

|  | TDE g/kg | TNM g/kg | FATS g/kg | LACTOSE g/kg | FATS/ TDE |
|---|---|---|---|---|---|
| Whey | 58.6 | 8.54 | — | 42.2 |  |
| Whey retentate | 85.0 | 29.3 | 1.5 | 43.7 |  |
| Permeate 1 | 51.6 | 2.77 | — | 42.4 |  |
| Milk | 125.4 | 31.7 | 41.5 | 44.4 |  |
| Retentate at $t_o$ + 2 h 01 | 250 | 103 | 98.5 | 34.4 |  |
| Permeate 2 | 55.7 | 2.79 | — | 46.3 |  |
| Final retentate | 450 | 204 | 210 | 10.4 | 0.466 |
| Permeate 3 | 28.8 | 3.92 | — | 20.9 |  |

(4) Conversion into cheese

The pre-cheese prepared as per (3) was converted into semi-hard cheeses in the following conditions (time $t_o$ being that of the beginning of the trial set forth above at (3)).

$t_o+3$ h 30:
renneting and continuous molding temperature of the pre-cheese before
rennet addition: 52°–53° C.
temperature of the pre-cheese after
rennet addition: 33°–35° C.
pH of the pre-cheese: 6.45
Amount of 1/10,000 rennet used: 25 ml/100 kg liquid pre-cheese
Gelation time: about: 15 mn $t_o+4$ h 30:
unhooping→draining (uncut cheese) or:
unhooping—cutting→draining (cut cheese)
cutting of the coagulum into 2×2×2 cm cubes $t_o+5$ h 30: pH of the coagulum 6.21
$t_o+7$ h 30: turning over the cheeses pH 5.50
Day: J+1
unhooping: pH 5.40
brining for 6 h 30:

Results

TABLE V

|  | TDE | FATS | DDE* | TNM | LAC-TOSE | FATS/DE |
|---|---|---|---|---|---|---|
| Uncut cheese J + 2 | 475.4 | 224.1 | 251.3 | 208.2 | 2.2 | 0.47 |
| Cut cheese J + 2 | 491.4 | 221.8 | 269.6 | 203.7 | 2.5 | 0.45 |
| Whey drained from the cut cheese | 165.6 | 10.0 | 155.6 | 123.1 |  |  |

*DDE = defatted dry extract

The data in the Table V are given in gr/kg.

The resulting cheeses had excellent organoleptic properties.

EXAMPLE 4

Production of "semi-hard" cheeses

Example 3 was repeated under slightly different conditions, using the same ultrafiltration equipment with the same raw materials, i.e. whey and fatty milk.

(1) Preparation of the whey retentate

The whey from Emmenthal cheese-making heated to 80° C. for 15 seconds was treated just upon its arrival to the plant.

The volume used was of 1,050 liters.

Ultrafiltration filling of the vat (400 liters)—Reheating to 50° C.
starting of the ultrafiltration in the following hydrodynamic conditions:
1st stage: $\Delta P=4.8$–2.9 bars
2nd stage: $\Delta P=4.0$–2.7 bars
the remaining whey was added by small portions into the vat of the ultrafiltration apparatus to compensate for the withdrawn volume of permeate.

The temperature of the whey varied during ultrafiltration between 55° C. and 48° C.

Performances: 855 liters of permeate (permeate 1) were withdrawn within 1 h 17 minutes.

pH of the whey retentate: 5.40.

(2) Preparation of the pre-cheese (mixture of milk and whey retentate)

The milk used was a milk for Emmenthal cheese-making heated to 80° C. for 15 seconds, fat-enriched through addition of pasteurized cream. Its volume was of 465 liters.

The milk was added to the whey retentate in the vat of the ultrafiltration apparatus: ultrafiltration was continued during the milk addition. The milk addition was effected as follows: about 200 liters as soon as the desired concentration of the whey was obtained, then the remainder by small portions as a compensation for the withdrawn permeate.

Progress of the ultrafiltration (including that of the whey)

$t_o$: starting of the whey ultrafiltration
$t_o+1$ h 17:
end of the whey ultrafiltration
addition of the milk
$t_o+1$ h 57:
end of the milk addition
$t_o+2$ h 02:
addition of 2 liters of thermophilic leavens
$t_o+2$ h 17:
volume of withdrawn permeate (permeate 2): 454 liters
Whey retentate pH: 6.40
Addition of 210 liters of water $t_o+3$ h 42: addition of:
- 90 ml of solution of proteolytic enzyme
- 0,9 l of thermophilic leavens
- 100 ml of suspension of propionic bacteria $t_o+3$ h 52:
- temperature 55° C.
- stoppage—retentate pH=6.33
- withdrawn permeate (permeate 3): 350 liters Results The results of the analyses are set forth in the following Table VI.

TABLE VI

|  | TDE g/kg | TNM g/kg | FATS g/kg | LACTOSE g/kg | FATS/DE |
|---|---|---|---|---|---|
| Whey | 60.9 | 8.2 | — | 44.0 | |
| Whey retentate | 85.6 | 27.2 | 1 | 42.1 | |
| Permeate 1 | 52.4 | 2.50 | — | 44.2 | |
| Milk | 120.8 | 30.2 | 36 | 44.9 | |
| Retentate at 2h17 | 203 | 75.7 | 70 | 39.5 | |
| Permeate 2 | 55.1 | 2.32 | — | 45.9 | |
| Final retentate | 462 | 225 | 208 | 12.3 | 0.45 |
| Permeate 3 | 32.8 | 2.95 | — | 26.3 | |

(3) Conversion into cheese

The pre-cheese prepared as per (2) was converted into semi-hard cheeses in the following conditions (time $t_o$ being that of the trial previously reported under (2)).

$t_o+4$ h 15:
- continuous rennetting and molding
- temperature of the pre-cheese before rennet addition: 54°-55° C.
- temperature of the pre-cheese after rennet addition: 38°-39° C.
- pH of the pre-cheese: 6.30
- amount of 1/10,000 rennet used 25 ml/100 kg of liquid pre-cheese
- gelation time about: 10 mn $t_o+6$ h 15:
- unhooping—draining pH: 5.30 (uncut cheese) or
- unhooping—cutting of the coagulum into cubes of 2×2×2 cm or 1×1×1 cm,
- brining of the cut coagulum
- re-hooping—draining (cut cheese)

$t_o+7$ h 00: turning over pH: 5.25

Day J+1
- unhooping pH: 5.05
- brining for 6 h 30 of the
- uncut cheeses pH: 5.20

Results

TABLE VII

|  | Grams per kilo of product | | | | Lactose | FATS/DE |
|---|---|---|---|---|---|---|
|  | TDE | FATS | DDE | TNM | | |
| Uncut cheese J + 5 | 495.6 | 218.7 | 276.9 | 226.0 | 0.8 | 0.44 |
| Cut cheese 2 × 2 × 2 J + 5 | 503.4 | 223.5 | 279.9 | 219.2 | — | 0.44 |
| Cut cheese 1 × 1 × 1 J + 5 | 514.5 | 237.9 | 276.6 | 226.0 | — | 0.46 |
| Whey drained from the cut cheese 2 × 2 × 2 | 177.9 | 4.0 | 173.9 | 83.8 | — | — |
| Whey drained from the cut cheese 1 × 1 × 1 | 183.3 | 2.0 | 181.3 | 95.6 | — | — |

The resulting semi-hard cheeses had excellent organoleptic qualities.

The advantageous results provided by the process of the invention are quite surprising since, in the state of knowledge in the art, it was deemed impossible to increase the whey protein content of the cheeses without prejudicing the organoleptic qualities of the latter.

The invention provides such a result through a process which is simple, easy to carry out with equipments conventional in cheese-making and leads to markedly improved yields in cheese-making.

I claim:

1. A process for utilizing recovered whey protein in cheese making which consists essentially of the following steps:
   (a) pasturizing the whey, then
   (b) ultrafiltering the whey to provide a whey protein concentrate at a concentration ratio of at least 3.5, then
   (c) mixing the whey protein concentrate from step (b) with full cream milk or skim milk or a mixture of the two to produce a protein enriched milk product, at a volume ratio of 2 to 5 milk to concentrate, then carrying out the following two steps (d) and (e) to produce an enriched curd:
   (d) ultrafiltering the protein enriched milk product to a concentration ratio of at least 3.5 and
   (e) curdling the casein contained in said protein enriched milk product with milk clotting enzyme thereby to produce curd and
   (f) separating the curd as a cheese product, the amount of whey protein in the concentrate added to the milk in step (c) being such that the total whey protein is at most 45% of the weight of the total proteins in the cheese produced in step (f) and the whey protein is retained in the soluble state in the curd, the fat content of the cheese product consisting essentially of that supplied by the above-named whey concentrate and milk admixed in step (c).

2. A process according to claim 1 wherein step (d) is carried out before step (e).

3. A process according to claim 1 wherein step (e) is carried out before step (d).

4. A process according to claim 1 where the concentration ratios in steps (b) and (d) are each in the range 5 to 6.

5. A process according to claim 1 wherein the ratio of fat to total dry extract of the cheese product is not more than about 0.47 to 1.

* * * * *